United States Patent
Chevanne et al.

(10) Patent No.: US 7,447,767 B2
(45) Date of Patent: Nov. 4, 2008

(54) SYSTEM FOR USE IN A COMMUNICATIONS NETWORK MANAGEMENT SYSTEM FOR AUTOMATIC MANAGEMENT OF NETWORK PLANT

(75) Inventors: Michel Chevanne, Clamart (FR); Philippe Drugmand, Fontenay Aux Roses (FR)

(73) Assignee: Alcatel, Paris (FR)

( * ) Notice: Subject to any disclaimer, the term of this patent is extended or adjusted under 35 U.S.C. 154(b) by 920 days.

(21) Appl. No.: 10/647,331

(22) Filed: Aug. 26, 2003

(65) Prior Publication Data
US 2004/0205073 A1  Oct. 14, 2004

(30) Foreign Application Priority Data
Aug. 29, 2002 (FR) .................... 02 10714

(51) Int. Cl.
*G06F 15/173* (2006.01)
(52) U.S. Cl. .................. 709/224; 709/223; 709/246; 707/10
(58) Field of Classification Search .......... 709/223, 709/224, 246; 707/10
See application file for complete search history.

(56) References Cited

U.S. PATENT DOCUMENTS

| 6,349,306 B1 | 2/2002 | Malik et al. | |
|---|---|---|---|
| 6,631,406 B1 * | 10/2003 | Pantages et al. | 709/223 |
| 6,681,232 B1 * | 1/2004 | Sistanizadeh et al. | 707/104.1 |
| 6,725,233 B2 * | 4/2004 | Froyd et al. | 707/103 R |
| 7,046,778 B2 * | 5/2006 | Martin et al. | 379/201.01 |
| 7,054,926 B1 * | 5/2006 | Abidi et al. | 709/223 |
| 7,143,156 B2 * | 11/2006 | Menzies et al. | 709/223 |
| 7,155,496 B2 * | 12/2006 | Froyd et al. | 709/220 |
| 2002/0152294 A1 * | 10/2002 | Evans et al. | 709/223 |
| 2002/0156880 A1 * | 10/2002 | Mokuya | 709/223 |
| 2003/0046381 A1 * | 3/2003 | Mokuya et al. | 709/223 |

FOREIGN PATENT DOCUMENTS

EP  1107108 A1  6/2001

OTHER PUBLICATIONS

M. Wollschlaeger, "A framework for fieldbus management using XML descriptions" Factory Communication Systems, 2000. Proceedings. 2000 IEEE International Workshop on Porto, Portugal, Sep. 6-8, 2000, Piscataway, NJ IEEE, US pp. 3-10, XP010521789.

* cited by examiner

*Primary Examiner*—Nathan Flynn
*Assistant Examiner*—Mohammad Siddiqi
(74) *Attorney, Agent, or Firm*—Sughrue Mion, PLLC

(57) ABSTRACT

A system (1) is dedicated to managing management data of plant (5) of a communications network, each unit of plant including a management information base (6) containing values of fields and associated with a management information base definition (7) including fields and accessible in a network management system (NMS). The system includes at least one automatic descriptor (8) that includes first data designating at least one type of network plant (5) and second data designating management information base definitions (7) associated with the type of plant (5), and is adapted, in the event of receiving data designating the type of plant (5), to access the fields of the management information base definitions (7) associated with the designated type and then to deliver third data representative of the fields of the plant (5) belong to the designated type.

18 Claims, 1 Drawing Sheet

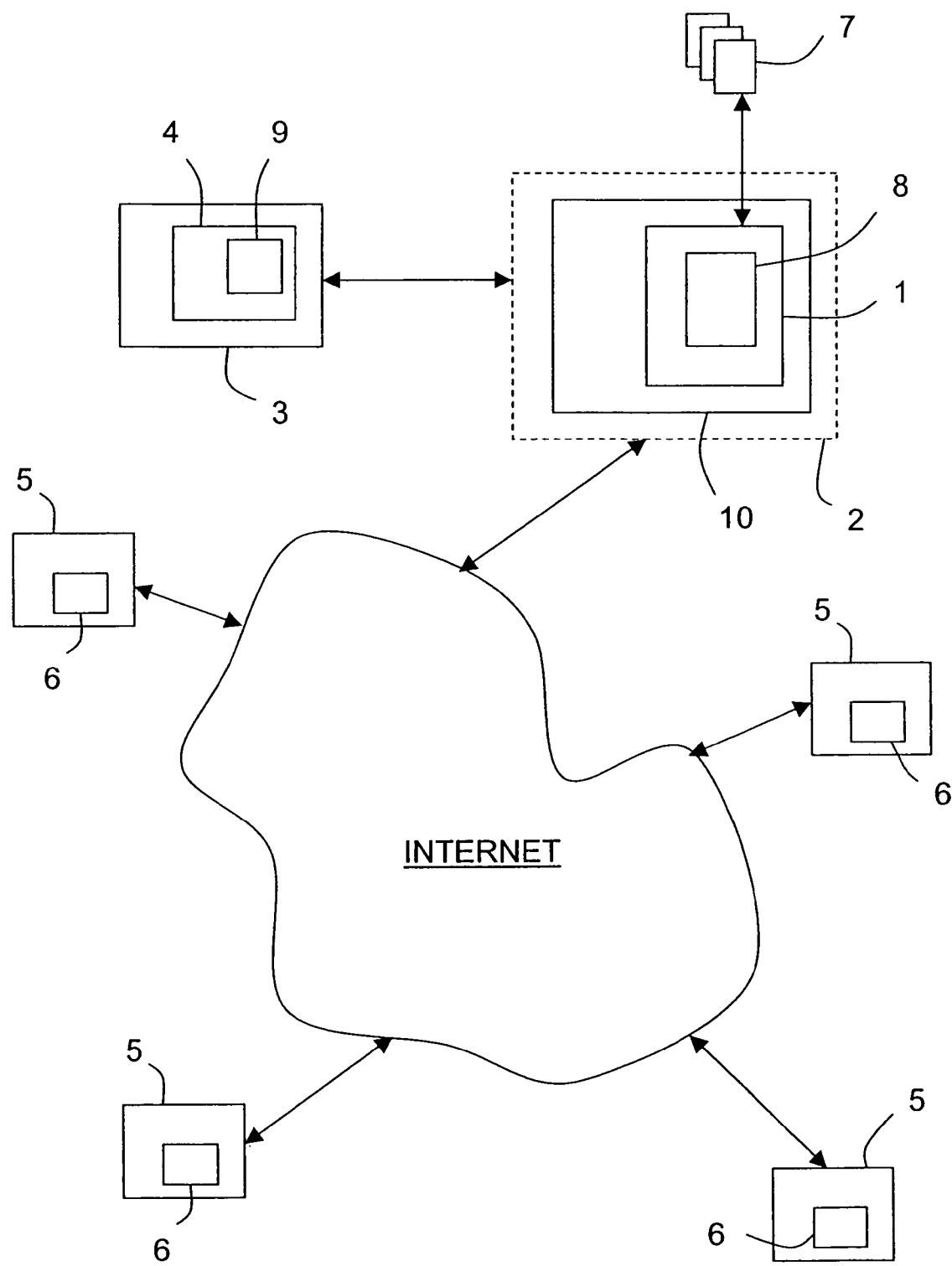
Sole Figure ived from French Patent Application No. 0210714 filed on Aug. 29, 2002, in the French Patent Office (Institut national de La Propriete Industrielle), the disclosures of which is incorporated herein in their entirety by reference.

SYSTEM FOR USE IN A COMMUNICATIONS NETWORK MANAGEMENT SYSTEM FOR AUTOMATIC MANAGEMENT OF NETWORK PLANT

CROSS-REFERENCE TO RELATED PATENT APPLICATION

This application claims priority from French Patent Application No. 0210714 filed on Aug. 29, 2002, in the French Patent Office (Institut national de La Propriete Industrielle), the disclosures of which is incorporated herein in their entirety by reference.

BACKGROUND OF THE INVENTION

1. Field of the Invention

The field of the invention is that of managing communications network plant, and more particularly that of managing the integration and evolution of new network plant by a network management system.

Communications networks generally include a network management system (NMS) enabling their managers or operators to manage and monitor the plant that constitutes their networks using tools executing operation, administration, maintenance, and provisioning (OAM&P) functions and services. In the present context, the plant can be of any type, for example servers, terminals, switches, routers, and concentrators, capable of exchanging data with the network management system in accordance with a network management protocol, for example the Simple Network Management Protocol (SNMP) of RFC 2571-2580.

Each unit of plant includes a management information base (MIB), which is also known as an object instance base, and contains information fields whose specific values characterize it. Also, each plant MIB is associated with a management information base definition (MIB definition) stored in the network management system.

Whenever new plant is launched onto the market, it must have a network management application so that it can be integrated into a network and managed by the network operator.

To facilitate this integration, tools such as MIB browsers and NMS applications, for example, have been developed.

MIB browsers are tools for extracting from a plant MIB information that characterizes the plant. They are generally installed in a network management server which also includes sets of MIB definitions, each definition containing information for the management of one specific unit of network plant. If the network manager requires information that defines a particular plant unit, the management server must load all of the MIB definitions that correspond to the type of plant concerned, then select the MIB definition associated with the designated unit, and finally request the MIB browser to find in the MIB of that unit the information that characterizes it.

2. Description of the Related Art

That information is then communicated by the management server to a graphical user interface of the NMS, so that the manager can take note of it and act accordingly.

MIB browsers have the advantage of requiring no programming once they have been installed in the management server. They are therefore easy to install and allow rapid integration of plant whose descriptors are already installed in the management server. However, they constitute a closed approach in that they cannot evolve to provide improved management services.

NMS applications are tools that present "views" of the network plant on a graphical user interface. To be more precise, these tools include sets of descriptors, each including data designating a type of network plant, data designating the necessary codes, which are generally in Java, for managing that type of plant and in particular for implementing a number of interfaces, as well as, where applicable, a set of configuration files, for example XML (eXtended Markup Language) files containing information for managing a type of network plant. When this kind of descriptor receives from the NMS a request designating plant of the type that it manages, it has a browser of the NMS extract from the MIB of the designated plant the values of certain of its fields, and then delivers to the NMS the data representative of the values extracted.

The above kind of NMS application using XML description files is described in the document "A Framework for Fieldbus Management Using XML Descriptions", by Martin Wollschlager, published in "Factory Communication Systems, 2000, Proceedings, 2000 IEEE International Workshop, Opporto, Portugal, 6-8 Sep., 2000", for example They are based on programming for efficient integration of plant into the network. It is therefore possible to have them evolve in such a manner as to provide improved management services. However, they must be programmed again each time that a new plant type has to be integrated, which significantly increases integration times and therefore costs.

Consequently, no prior art tool is truly satisfactory in terms of both integration time and capacity to evolve.

SUMMARY OF THE INVENTION

An object of the invention is to remedy some or all of the drawbacks previously cited.

To this end it proposes a system for managing management data of plant of a communications network, each unit of plant including a management information base containing values of fields and associated with a management information base definition including fields and accessible in a network management system.

The system is characterized in that it includes at least one automatic descriptor that includes first data designating at least one type of network plant and second data designating management information base definitions associated with said plant type, and is adapted, in the event of receiving data designating said type of plant, to access the fields of said management information base definitions associated with the designated type and then to deliver third data representative of the fields of the plant of the designated type.

In the present context, the term "automatic descriptor" means a descriptor of the type discussed in the introduction (i.e. including a set of program code files, preferably in Java, for implementing a number of interfaces, and a set of configuration files, for example XML files, containing information for managing a type of network plant), but also including a file of program codes including first data designating at least one plant type and another file of program codes including second data designating MIB definitions associated with plant of said type.

According to another feature of the invention, the system can include a set of non-automatic descriptors in addition to the automatic descriptor.

According to a further feature of the invention, the automatic descriptor is preferably adapted, in the event of receiving data designating an address of a plant unit of the designated type, to access the fields of the management information definition associated with the designated plant unit, then to command extraction from the management information base of the designated plant of the values of at least some of the fields contained in the definition, and then to deliver third data representative of the extracted values.

If the management information bases of the plant take the form of a tree associated with at least one table, the automatic descriptor is preferably adapted to deliver third data in the form of a tree and at least one table including the extracted field values.

The automatic descriptor is preferably adapted to extract the field values from the management information bases of the plant of the network.

The automatic descriptor can include fourth data designating a graphical representation such that the third data can be displayed in a chosen format.

The invention also provides a management server of a communications network including plant wherein each plant unit includes a management information base (MIB) that contains values of fields and is associated with a management information base definition including fields, which server is characterized in that it includes a management system of the type defined hereinabove.

The invention further provides a method of managing management data of plant of a communications network wherein each plant unit includes a management information base containing values of fields and associated with a management information base definition including fields and accessible in a network management system.

The method is characterized in that it consists in providing an automatic descriptor including first data designating at least one type of plant of the network and second data designating management information base definitions associated with the type(s) of plant and, in the event of designation of a type of plant, using the automatic descriptor to access the fields of the management information base definitions associated with the designated type and then delivering third data representative of fields of plant of the designated type.

The method according to the invention can have the following complementary features in particular, either separately or in combination:
  in the event of designating an address of a plant unit in addition to its type, the automatic descriptor can be used to access the field of the management information base definition associated with the designated plant and the values from at least some of the fields contained in the definition are extracted from the management information base of the plant designated by the address received, after which third data representative of the extracted values is delivered,
  in the case of management information bases taking the form of a tree associated with at least one table, the automatic descriptor can be used to deliver third data in the form of a tree and at least one table including the extracted field values,
  if the automatic descriptor includes fourth data designating a graphical representation, the third data can be displayed in a chosen format corresponding to the graphical representation.

The invention can in particular be used in all network technologies that must be managed, and particularly in transmission networks (for example WDM, SONET, SDH networks), data networks (for example Internet-IP or ATM networks), or voice networks (for example conventional, mobile or NGN networks).

Other features and advantages of the invention become apparent on reading the following detailed description and on examining the single FIGURE of the appended drawing, which is a diagram showing an example of a communications network equipped with a management system according to the invention installed in a network management server. The FIGURE is for the most part of a specific nature and consequently constitutes part of the description of the invention as well as, if necessary, contributing to the definition of the invention.

BRIEF DESCRIPTION OF THE DRAWINGS

The sole FIGURE of the present application illustrates a relationship between a network management system and associated network plants according to an exemplary embodiment of the present invention.

DETAILED DESCRIPTION OF EXEMPLARY EMBODIMENTS

The invention proposes a network management system intended to provide the manager of a communications network with fast and simpler access, via the network management system, to management information on network plant to be managed and/or configured.

In the example shown in the FIGURE, the management system 1 is installed in a management server 2 of the network management system NMS, to be more precise in its management module 10. However, it could be installed in an external unit connected to said management server 2, which is connected to a management terminal 3 of the network manager which is equipped with a graphical user interface (GUI) 4. In the example shown, there is only one management server 2. However, a NMS including a plurality of management servers can be envisaged, each of the servers being equipped with a management system 1, for example to enable each server to manage a portion of the network plant.

The communications network includes several kinds of network plant 5, for example servers, terminals, switches or routers, which can exchange data with the NMS, and in particular with its management server 2, in accordance with a network management protocol. Each unit of the plant 5 conventionally includes a management information base (MIB) 6, which is also known as an object instance base.

Each MIB 6 includes information fields whose specific values characterize the associated plant. Moreover, each MIB is associated with a management information base definition (MIB definition) 7, which is stored in the NMS and accessible to the management server 2, and in particular to its management module 10.

A MIB definition 7 generally defines, for the plant concerned, all its possible attributes, a type of data (string, integer, etc.), a naming scheme (which is generally organized in the form of a tree associated with one or more tables), text defining the plant (or object), access rights, a hierarchy of the objects (or plant), and so on.

For example, an attribute (or field) can be defined as indicated hereinafter in an MIB definition 7:

sysDescr OBJECT-TYPE
  SYNTAX DisplayString (SIZ (0 . . . 255))
  ACCESS read-only or read/write
  STATUS Mandatory
  DESCRIPTION
    "A textual description of the plant (or entity). This value must include the full name and the identification of the version of the type of hardware of the system, of the software of the operating system, and of the network software. It is mandatory that it contain only writable characters, in ASCII codes."
  : :={system 1}

The above MIB definitions 7 conform to the RFC 1213 standard.

Hereinafter, it is considered by way of non-limiting example that the communications network is of the Internet Protocol (IP) type and that the network management protocol is the Simple Network Management Protocol (SNMP) of RFC 2571-2580. Of course, the invention applies to other types of network, for example WDM, SONET or SDH transmission networks, ATM data networks, and conventional, mobile or NGN voice networks, and to other network management protocols, for example the TL1, CORBA, and CMISE/CMIP protocols.

The management system 1 includes an automatic descriptor 8 including first data that designates one or more types of network plant 5 and second data that designates the MIB definitions associated with the plant of each type.

An automatic descriptor consists of a set of program code files, preferably in Java, for implementing a number of interfaces, and a set of configuration files, for example XML files, that contain information for managing one or more types of network plant 5. Its general structure is therefore similar to that of a conventional descriptor. However, unlike conventional descriptors, which are associated with one and only one unit of network plant, it is generic because it includes a basic structure suitable for all network plant and coupled to a first file containing data that designates one or more plant types and to a second file containing data that designates the MIB definitions associated with plant of the type concerned. Thanks to this original structure, the automatic descriptor 8 can be adapted to any type of plant, as it suffices to modify the data in the first file that designates the type of plant and the data in the second file that designates the MIB definitions 7 associated with plant of the type concerned.

Thanks to the structure described hereinabove, when it receives from the management module 10 of the management server 2, at the request of the management terminal 3, data that designates the type of plant 5 for which it is configured, the automatic descriptor 8 can access the fields of the MIB definitions 7 in the NMS that are associated with the designated type and deliver third data representative of the fields of the network plant 5 that belongs to that type. Once it has obtained the third data, the management server 2 can supply it to the graphical user interface 4 of the management terminal 3, via the management server 2, so that the network manager can view it in the form of a tree showing the various units of the network plant 5, grouped according to the type initially requested.

If the network manager wishes to obtain information on one unit of the plant 5 of the type originally requested, in other words to obtain details on a portion of the displayed tree, he sends the address of the plant to the management module 10 of the server 2 via his graphical user interface (GUI) 4. The management module 10 sends the address to the automatic descriptor 8 which manages plant of the type to which it belongs.

The automatic descriptor 8 receives the designation of the address of a unit of the plant 5 whose type it manages and accesses the MIB descriptor 7 associated with the unit in order to determine the fields for which it will have to obtain specific values (contained in the MIB 6 of the plant). It then knows what attributes and/or tables exist in the MIB 6 of the unit of the plant 5. For example, once the automatic descriptor 8 knows that the field (attribute) "sysDescr" previously defined exists, it has only to obtain its value, which is equal to "router No. 1", for example, and which is contained in the MIB 6 of the unit of the plant 5.

Once the automatic descriptor 8 is in possession of the "behavior" of the unit of the plant 5, it looks up in the MIB 6 of the unit the specific values of the fields extracted from the MIB definition 7 associated with the unit.

The values of the fields are preferably extracted from the MIB 6 using the SNMP. However, they could equally well be extracted using another management protocol, for example the CMISE/CMIP, CORBA, or TL1 protocol.

These field values constitute third data that is supplied by the interrogated unit of the plant 5 to the automatic descriptor 8 and then communicated to the management terminal 3 so that it can be displayed in a format defined by the automatic descriptor 8.

It is possible to use the automatic descriptor 8 either on the server side and the client side or only on the server side. In the former case, the third data is displayed in the form of a tree and at least one table containing the extracted field values, if the MIBs 6 of the plant 5 are arranged in this way. To achieve this, it suffices for the browser module 9 to be similar to a microcomputer browser, being specifically dedicated to displaying the alarm state for each object or plant represented.

In the latter case, there is added to the automatic descriptor 8 a complementary file including fourth data that designates a chosen graphical representation addressed to the graphical user interface (GUI) 4. This graphical representation corresponds to a particular display format that enables the display of the third data on the screen of the management terminal 3 to be adapted as a function of the plant concerned, to be more precise its inherent characteristics.

In these two embodiments, the fourth data that designates the graphical representation is sent to the management module 10 of the management server 2, which is capable of arranging the third data supplied at the same time by the automatic descriptor 8 in the format defined by the designated graphical representation. The third data is then sent to the graphical user interface 4 of the management terminal 3 and displayed.

This facilitates the processing by the network manager of the information that defines the plant displayed.

In the foregoing description, a management system 1 is installed in the management server 2 and includes at least one automatic descriptor 8 able to extract data from the MIBs 6 of the plant 5 that it manages and to cooperate with a browser module 9 of the graphical user interface (GUI) 4 of the manager of the network to display extracted data in a chosen format. A management system of the above kind can therefore be installed in a prior art management server already equipped with an MIB browser and conventional descriptors. In this case the automatic descriptor 8 of the invention replaces the conventional descriptors and cooperates with the browser module of the graphical user interface (GUI) 4.

The invention also provides a method of managing management data of communications network plant 5, each unit of the plant including an MIB 6 associated with an MIB definition 7 accessible via an NMS.

The latter method can be implemented by the management system 1 described hereinabove. The main functions and the optional sub-functions of the steps of the method being substantially identical to those of the various means constituting the management system 1, only the steps implementing the main functions of the method according to the invention are summarized hereinafter.

The method is characterized in that it consists in providing at least one automatic descriptor 8 of the type previously described and, in the even of designation of a type of plant 5 managed by the automatic descriptor 8, using the latter to access the fields of the MIB definitions 7 associated with the designated type and then to deliver third data representative of the fields of the plant 5 of the designated type.

If the address of a unit of the plant 5 is designated in addition to its type, it is preferably possible, using the automatic descriptor 8, to access the field of the MIB definition 7 which is associated with the designated unit and then to extract from the MIB 6 of the designated unit the values of at least some of the fields contained in the MIB definition 7 that is associated with it, after which third data representative of the extracted values can be supplied.

The invention is not limited to the embodiments of the method, management system, and management server described hereinabove by way of example only, but encompasses all variants that the person skilled in the art might envisage that fall within the scope of the following claims.

Thus a network has been described in which the network management system NMS includes only one management server equipped with a network management system NMS according to the invention adapted to manage all the plant of the network. However, the network management system could include a plurality of management servers each equipped with a management system according to the invention for managing a portion of the plant of the network.

Moreover the system according to the invention can be incorporated into a prior art management system using conventional descriptors, in which case its automatic descriptor complements said conventional descriptors.

The invention claimed is:

1. A network management system for managing management data of an object plant of a communications network, the object plant including a management information base containing a value of a field and associated with an MIB definition including a corresponding field and accessible in the network management system, the system comprising:
   an MIB definition unit that stores MIB definitions corresponding to a plurality of types of plant and including the MIB definition associated with a type of the object plant; and
   at least one automatic descriptor unit that:
      designates the object plant when the object plant joins the communication network, wherein the designation of the object plant is performed by using first data configured to designate a plurality of types of plant;
      designates the MIB definition associated with the type of the object plant using second data; and
      in the event of receiving data designating the type of the object plant, accesses the corresponding field of the MIB definition associated with the type of the object plant, and then delivers third data representative of the value of the filed contained in the MIB of the object plant.

2. A system according to claim 1, further comprising at least one non-automatic descriptor unit in addition to the at least one automatic descriptor unit.

3. A system according to claim 1, characterized in that the at least one automatic descriptor unit, in the event of receiving data designating an address of the object plant, accesses the corresponding field of the MIB definition, then commands extraction from the MIB of the object plant of the value of the field, and then delivers the value as the third data.

4. A system according to claim 3, characterized in that, if the MIB of the object plant takes a form of a tree associated with at least one table, the at least one automatic descriptor delivers the third data in the form of a tree and at least one table including the extracted field value.

5. A system according to claim 3, characterized in that the at least one automatic descriptor extracts the field value from the MIB of the object plant.

6. A system according to claim 1, characterized in that the at least one automatic descriptor includes fourth data designating a graphical representation such that the third data is displayed in a chosen format.

7. A system according to claim 1, characterized in that the at least one automatic descriptor comprises at least one set of program code files and at least one set of configuration files.

8. A system according to claim 7, characterized in that the program code files includes the first data designating the type of the object plant and the second data designating the MIB definition associated with the type of the object plant.

9. A system according to claim 7, characterized in that the program code files are in Java.

10. A system according to claim 1, characterized in that the field value is extracted in accordance with a protocol chosen from the group comprising the SNMP, CORBA, CMISE/CMIP, and TL1 protocols.

11. A management server of a communications network including a plurality of plants wherein each of the plants includes a management information base (MIB) that contains a value of a field, and is associated with an MIB definition including a corresponding filed, which server is characterized in that it includes the system according to claim 1.

12. A system according to claim 1, characterized in that said communications network comprises at least one of a WDM network, a SONET network, an SDH network, an Internet Protocol (IP) network, an ATM network, a conventional voice network, a mobile voice network, and an NGN network.

13. A system according to claim 2, characterized in that said communications network comprises at least one of a WDM network, a SONET network, an SDH network, an Internet Protocol (IP) network, an ATM network, a conventional voice network, a mobile voice network, and an NGN network.

14. A method of managing management data of an object plant of a communications network wherein the object plant includes a management information base (MIB) containing a value of a field and associated with an MIB definition including a corresponding and accessible in the network management system, the method comprising:
   causing at least one automatic descriptor to designate the object plant using first data designating a plurality of types of plant including the type of the object plant when the object plant joins the communication network, and to designate the MIB definition associated with the type of the object plant using second data, and, in the event of designation of the type of the object plant, to access the corresponding field the MIB definition associated with the type of the object plant; and
   delivering third data representative of the value of the filed contained in the MIB of the object plant.

15. A method according to claim 14, characterized in that, if an address of the network plant is designated in addition to the type of the object plant, the at least one automatic descriptor is used to access the corresponding field of the MIB definition, and the value of the field is extracted from the MIB of the object plant designated by the address, after which the third data representative of the value is delivered.

16. A method according to claim 15, characterized in that, if the MIB takes a form of a tree associated with at least one table, the at least one automatic descriptor is used to deliver the third data in the form of a tree and at least one table including the extracted field value.

17. A method according to claim 14, characterized in that, if the at least one automatic descriptor includes fourth data designating a graphical representation, the third data is displayed in a chosen format corresponding to the graphical representation.

18. A method according to claim 14, characterized in that said communications network comprises at least one of a WDM network, a SONET network, an SDH network, an Internet Protocol (IP) network, an ATM network, a conventional voice network, a mobile voice network, and an NGN network.

* * * * *